(12) United States Patent
Endo et al.

(10) Patent No.: US 9,871,413 B2
(45) Date of Patent: Jan. 16, 2018

(54) WIRELESS POWER RECEIVING APPARATUS

(71) Applicant: ADVANTEST CORPORATION, Tokyo (JP)

(72) Inventors: Yuki Endo, Tokyo (JP); Yasuo Furukawa, Tokyo (JP)

(73) Assignee: ADVANTEST CORPORATION, Tokyo (JP)

( * ) Notice: Subject to any disclaimer, the term of this patent is extended or adjusted under 35 U.S.C. 154(b) by 385 days.

(21) Appl. No.: 14/625,630

(22) Filed: Feb. 19, 2015

(65) Prior Publication Data

US 2015/0180287 A1 Jun. 25, 2015

Related U.S. Application Data

(63) Continuation of application No. PCT/JP2013/005872, filed on Oct. 2, 2013.

(30) Foreign Application Priority Data

Oct. 18, 2012 (JP) .................................. 2012-230522

(51) Int. Cl.
*H01F 27/42* (2006.01)
*H02J 17/00* (2006.01)
*H02J 5/00* (2016.01)
*H02M 7/219* (2006.01)

(52) U.S. Cl.
CPC ............... *H02J 17/00* (2013.01); *H02J 5/005* (2013.01); *H02M 7/219* (2013.01)

(58) Field of Classification Search
CPC ........... H02J 17/00; H02J 5/005; H02M 7/219

USPC .......................................................... 307/104
See application file for complete search history.

(56) References Cited

U.S. PATENT DOCUMENTS

| 8,258,653 B2* | 9/2012 | Kitamura | ............... | H02J 5/005 307/104 |
| 2010/0187912 A1* | 7/2010 | Kitamura | ............... | H02J 5/005 307/104 |
| 2011/0285211 A1* | 11/2011 | Endo | .................. | H02J 17/00 307/104 |
| 2011/0316347 A1* | 12/2011 | Endo | .................. | H04B 5/0037 307/104 |

(Continued)

FOREIGN PATENT DOCUMENTS

| CN | 101789636 A | 7/2010 |
| JP | 2000-166129 | 6/2000 |

(Continued)

OTHER PUBLICATIONS

Taiwanese Office Action corresponding to Application No. 102136900; dated Oct. 24, 2016, with English translation.

(Continued)

*Primary Examiner* — Ryan Jager
(74) *Attorney, Agent, or Firm* — Cantor Colburn LLP

(57) ABSTRACT

A first switch is arranged between one end of a reception antenna and one end of a load. A second switch is arranged between the aforementioned one end of the reception antenna and the other end thereof. A switch control circuit controls switching on and off the first switch and the second switch. The switch control circuit is structured to change the ratio of the on time of the first switch with respect to the period of an electric power signal.

13 Claims, 11 Drawing Sheets

(56) References Cited

U.S. PATENT DOCUMENTS

2012/0068548 A1* 3/2012 Endo .................. H02J 5/005
                                                                              307/104

FOREIGN PATENT DOCUMENTS

| JP | 2002-078247 | 3/2002 |
|----|-------------|--------|
| JP | 2010-200594 | 9/2010 |
| JP | 2012-010586 | 1/2012 |
| TW | 201126861 A | 8/2011 |
| WO | 2012/035745 | 3/2012 |

OTHER PUBLICATIONS

Office action dated Feb. 17, 2015 from corresponding JP Patent Application No. 2012-230522 and its English translation by the applicants.
ISR for related PCT/JP2013/005872 dated Dec. 17, 2013 and its English translation.
IPRP/WO for related PCT/JP2013/005872 dated Apr. 21, 2015 and its English translation.
Karalis, et al. "Efficient wireless non-radiative mid-range energy transfer." Annals of Physics 323 (2008) 34-48.

\* cited by examiner

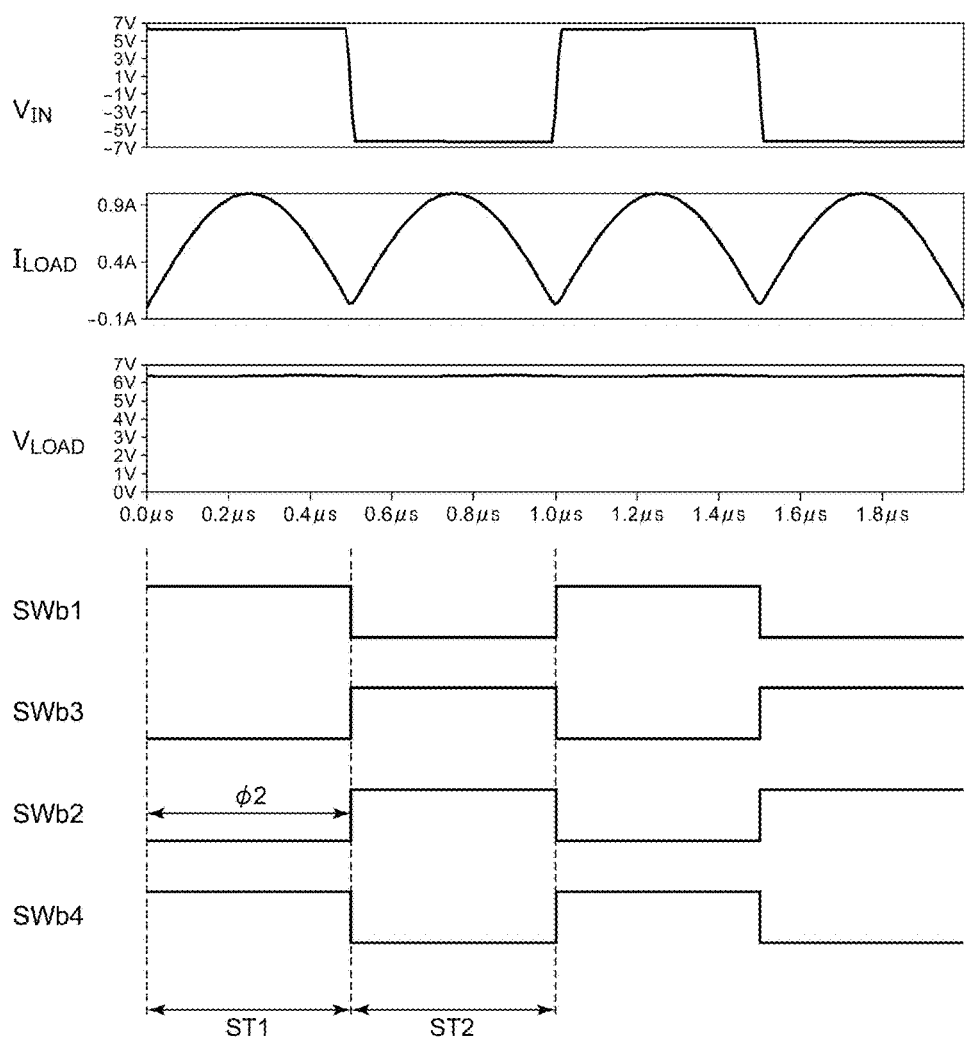

ST1

ST3

WIRELESS POWER RECEIVING APPARATUS

CROSS-REFERENCE TO RELATED APPLICATIONS

This application is a continuation of International Patent Application No. PCT/JP2013/005872, filed on Oct. 2, 2013, which claims priority to Japanese Patent Application No. 2012-230522, filed on Oct. 18, 2012, the disclosures of which are hereby incorporated by reference in their entireties.

BACKGROUND OF THE INVENTION

1. Field of the Invention

The present invention relates to a wireless power supply technique.

2. Description of the Related Art

In recent years, wireless (contactless) power transmission has been receiving attention as a power supply technique for electronic devices such as cellular phone terminals, laptop computers, etc., or for electric vehicles. Wireless power transmission can be classified into three principal methods using an electromagnetic induction, an electromagnetic wave reception, and a magnetic resonance.

The electromagnetic induction method is employed to supply electric power at a short range (several cm or less), which enables electric power of several hundred watts to be transmitted in a band that is equal to or lower than several hundred kHz. The power use efficiency thereof is on the order of 60% to 98%.

In a case in which electric power is to be supplied over a relatively long range of several meters or more, the electromagnetic wave reception method is employed. The electromagnetic wave reception method allows electric power of several watts or less to be transmitted in a band between medium waves and microwaves. However, the power use efficiency thereof is small. The magnetic resonance method has been receiving attention as a method for supplying electric power with relatively high efficiency at a middle range on the order of several meters. (A. Karalis, J. D. Joannopoulos, M. Soljacic, "Efficient wireless non-radiative mid-range energy transfer" ANNALS of PHYSICS Vol. 323, January 2008, pp. 34-48").

With electric power transmission by means of magnetic field coupling, the electromagnetic induction inter-coil coupling coefficient k is reduced according to the cube of the distance. Accordingly, the coupling coefficient k changes over time according to a change in the relative positions of a transmission coil and a reception coil.

SUMMARY OF THE INVENTION

The present inventors have come to recognize that, with such a power transmission system using magnetic resonance, the power supply efficiency and the amount of electric power that can be supplied both change with the coupling coefficient k and the impedance of a power receiving apparatus side as their parameters. In other words, if the impedance of the power receiving apparatus side can be dynamically changed according to a change in the coupling coefficient k, such an arrangement is capable of controlling the power supply efficiency and the amount of electric power.

The above-described problem is by no means within the scope of common and general knowledge in the field of the present invention. Furthermore, it can be said that the present applicant has been the first to arrive at this consideration.

The present invention has been made in order to solve such a problem. Accordingly, it is an exemplary purpose of an embodiment of the present invention to provide an impedance control circuit that is capable of controlling the impedance of a power receiving apparatus.

An embodiment of the present invention relates to an impedance control circuit employed in a wireless power receiving apparatus that receives an electric power signal including any one from among an electric field component, a magnetic field component, and an electromagnetic field component transmitted from a wireless power supply apparatus. The impedance control circuit is arranged between a reception antenna arranged to receive the electric power signal and a load. The impedance control circuit comprises: a first switch arranged between one end of the reception antenna and one end of the load; a second switch arranged between said one end of the reception antenna and an other end of the reception antenna; and a switch control circuit that switches on and off the first switch and the second switch. The switch control circuit is structured to change a ratio of the on time of the first switch with respect to a period of the electric power signal.

With such an embodiment, the impedance on the load side as viewed from the reception antenna can be changed according to a ratio (duty ratio) of the on time of the first switch.

Also, the switch control circuit may turn on the first switch and may turn off the second switch during a variable on time in a first half cycle in which a current is induced in the reception antenna such that it flows in a first direction, and may turn off the first switch and may turn on the second switch during a remainder of the first half cycle.

In this case, by turning on the second switch during the remainder of the first half cycle, such an arrangement provides a reduced impedance on the load side as viewed from the reception antenna during this period. Thus, such an arrangement is capable of reducing the time average of the impedance on the load side as viewed from the reception antenna, as compared with a case in which synchronous rectification is performed.

Also, the switch control circuit may turn on the first switch and may turn off the second switch during a variable on time in a first half cycle in which a current is induced in the reception antenna such that it flows in a first direction, and may turn off the first switch and the second switch during a remainder of the first half cycle.

In this case, by turning off the second switch during the remainder of the first half cycle, such an arrangement provides an increased impedance on the load side as viewed from the reception antenna during this period. Thus, such an arrangement is capable of increasing the time average of the impedance on the load side as viewed from the reception antenna, as compared with a case in which synchronous rectification is performed.

Also, the switch control circuit may turn off the first switch and may turn on the second switch during a period of a second half cycle in which a current is induced in the reception antenna such that it flows in a second direction.

Another embodiment of the present invention also relates to an impedance control circuit. The impedance control circuit comprises: a third switch arranged between one end of the reception antenna and one end of the load; an impedance element arranged between said one end of the reception antenna and an other end of the reception antenna;

and a switch control circuit that switches on and off the third switch. The switch control circuit is structured to change a ratio of the on time of the third switch with respect to a period of the electric power signal.

With such an embodiment, the impedance on the load side as viewed from the reception antenna can be changed according to the ratio (duty ratio) of the on time of the third switch.

Also, the switch control circuit may turn on the third switch during a variable on time in a first half cycle in which a current is induced in the reception antenna such that it flows in a first direction, and may turn off the third switch during a remainder of the first half cycle.

Also, the switch control circuit may turn off the third switch during a period of a second half cycle in which a current is induced in the reception antenna such that it flows in a second direction.

Also, the impedance element may comprise a capacitor.

Such an arrangement is capable of preventing the voltage between both ends of the reception antenna from exceeding the breakdown voltage of the circuit during a period in which the third switch is turned off in the first half cycle.

Also, the impedance element may comprise a diode. In this case, the diode functions as a clamp element. Thus, such an arrangement is capable of preventing the voltage between both ends of the reception antenna from exceeding the breakdown voltage of the circuit during a period in which the third switch is turned off in the first half cycle.

Yet another embodiment of the present invention also relates to an impedance control circuit. The impedance control circuit comprises: a first input line connected to one end of the reception antenna; a second input line connected to an other end of the reception antenna; a first output line connected to one end of the load; a second output line connected to an other end of the load; an H-bridge circuit comprising a first switch arranged between the first input line and the first output line, a second switch arranged between the second input line and the first output line, a third switch arranged between the first input line and the second output line, and a fourth switch arranged between the second input line and the second output line; and a switch control circuit that switches on and off the first switch through the fourth switch of the H-bridge circuit. The switch control circuit is structured to change a phase of a switching operation for each of the first switch through the fourth switch.

With such an embodiment, the impedance on the load side as viewed from the reception antenna can be changed according to the switching phases of the first switch through the fourth switch.

Also, the switch control circuit may be structured to switch on and off a pair of the first switch and the third switch in a complementary manner with the same frequency as that of the electric power signal, and to switch on and off a pair of the second switch and the fourth switch in a complementary manner with the same frequency as that of the electric power signal. Also, the switch control circuit may be structured to independently change a phase of switching on and off the pair of the first switch and the third switch and a phase of switching on and off the pair of the second switch and the fourth switch.

Also, the switch control circuit may be structured to sequentially switch its state in synchronization with the electric power signal between: a first state in which the first switch and the fourth switch are turned on and the second switch and the third switch are turned off; a second state in which the first switch and the second switch are turned on and the third switch and the fourth switch are turned off, or otherwise the first switch and the second switch are turned off and the third switch and the fourth switch are turned on; a third state in which the second switch and the third switch are turned on and the first switch and the fourth switch are turned off; and a fourth state in which the first switch and the second switch are turned on and the third switch and the fourth switch are turned off, or otherwise the first switch and the second switch are turned off and the third switch and the fourth switch are turned on. Also, the switch control circuit may be further structured to change a length of each of the first state through the fourth state. Also, the switch control circuit may be further structured to change a transition phase of a cycle of the first state through the fourth state.

Yet another embodiment of the present invention relates to a wireless power receiving apparatus. The wireless power receiving apparatus comprises: a reception antenna that receives an electric power signal including any one from among an electric field component, a magnetic field component, and an electromagnetic field component transmitted from a wireless power supply apparatus; and any one of the aforementioned impedance control circuits, which is connected to the reception antenna.

Yet another embodiment of the present invention relates to a wireless power supply system. The wireless power supply system comprises: a wireless power supply apparatus that transmits an electric power signal including any one from among an electric field component, a magnetic field component, and an electromagnetic field component; and the aforementioned wireless power receiving apparatus.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 9 is an operation waveform diagram showing the operation of the wireless power receiving apparatus when $\varphi 1=0$ degrees and $\varphi 2=180$ degrees;

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

Figure 1:
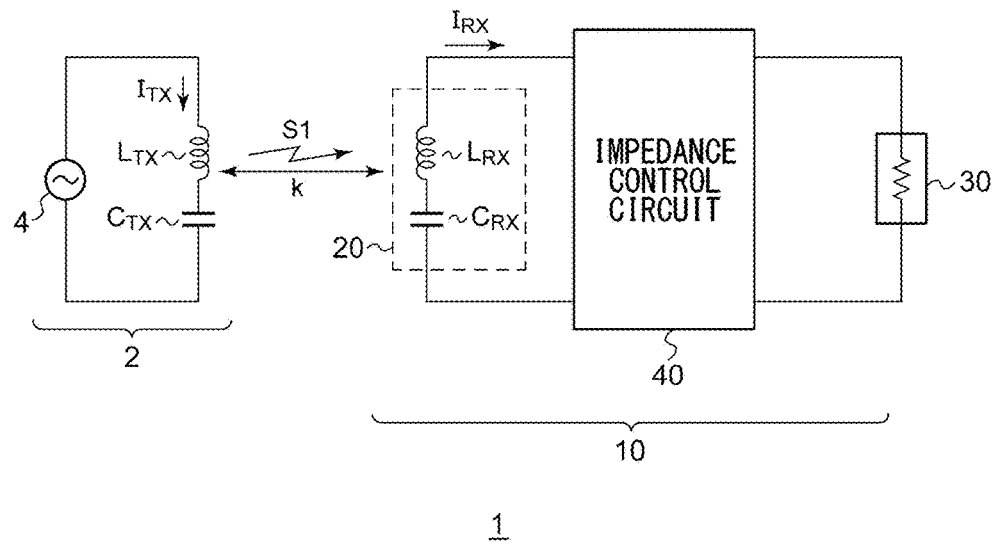
FIG. 1 is a circuit diagram showing a configuration of a wireless power supply system according to an embodiment.

FIG. 1 is a circuit diagram showing a configuration of a wireless power supply system 1 according to an embodiment. The wireless power supply system 1 includes a wireless power supply apparatus 2 and a wireless power receiving apparatus 10. First, description will be made regarding a configuration of the wireless power supply apparatus 2.

The wireless power supply apparatus 2 transmits an electric power signal to the wireless power receiving apparatus 10. As such an electric power signal S1, the wireless power supply system 1 uses the near-field components (magnetic field, or electromagnetic field) of electromagnetic waves that have not yet become radio waves.

The wireless power supply apparatus 2 includes an AC power supply 4, a transmission coil $L_{TX}$, and a resonance capacitor $C_{TX}$. The AC power supply 4 generates a driving signal having a predetermined frequency, or otherwise a driving signal subjected to frequency modulation, phase modulation, amplitude modulation, or the like. This allows the transmission antenna $L_{TX}$ to generate a coil current $I_{TX}$. For ease of understanding and simplification of description, description will be made in the present embodiment regarding an arrangement in which the driving signal is configured as an AC signal having a constant frequency. For example, the driving signal is configured to have a frequency selected as appropriate in a range between several hundreds of kHz and several MHz.

The transmission coil $L_{TX}$ is configured as an antenna that emits a near-field signal (electric power signal) S1 including any one from among an electric field component, a magnetic field component, and an electromagnetic field component, in response to the driving signal S2 generated by the AC power supply 4. The resonance capacitor $C_{TX}$ is arranged in series with the transmission coil $L_{TX}$, which forms a resonance circuit. The resonance capacitor $C_{TX}$ tunes the resonance frequency of the resonance circuit such that it matches the frequency of the driving signal S2.

The above is the configuration of the wireless power supply apparatus 2. Next, description will be made regarding a configuration of the wireless power receiving apparatus 10.

The wireless power receiving apparatus 10 receives the electric power signal S1 transmitted from the wireless power supply apparatus 2. The wireless power receiving apparatus 10 includes a reception antenna 20, a load 30, and an impedance control circuit 40.

The reception antenna 20 receives the electric power signal S1 transmitted from the transmission coil $L_{TX}$. The reception antenna 20 includes a reception coil $L_{RX}$ and a resonance capacitor $C_{RX}$ connected in series. The reception antenna 20 is tuned such that its resonance frequency matches the frequency of the electric power signal S1.

A coil current (resonance current) $I_{RX}$ induced according to the electric power signal S1 flows through the reception coil $L_{RX}$. The wireless power receiving apparatus 10 acquires electric power from the coil current $I_{RX}$.

The impedance control circuit 40 is arranged between the reception antenna 20 and the load 30. The impedance control circuit 40 rectifies the coil current $I_{RX}$ that flows through the reception antenna 20, and supplies the coil current $I_{RX}$ thus rectified to the load 30. Furthermore, the impedance control circuit 40 controls the impedance (which will be referred to as the "receiver end impedance Z") on the load 30 side as viewed from the reception antenna 20. The kind of load 30 is not restricted in particular. Typically, its equivalent circuit includes a capacitor C1 for charge storage and a resistance component R1. The resultant impedance of the capacitor C1 and the resistance component R1 will be represented by Ro.

The above is the description of the overall configuration of the wireless power supply system 1. Next, description will be made regarding the impedance control circuit 40.

First Embodiment

Figure 2:
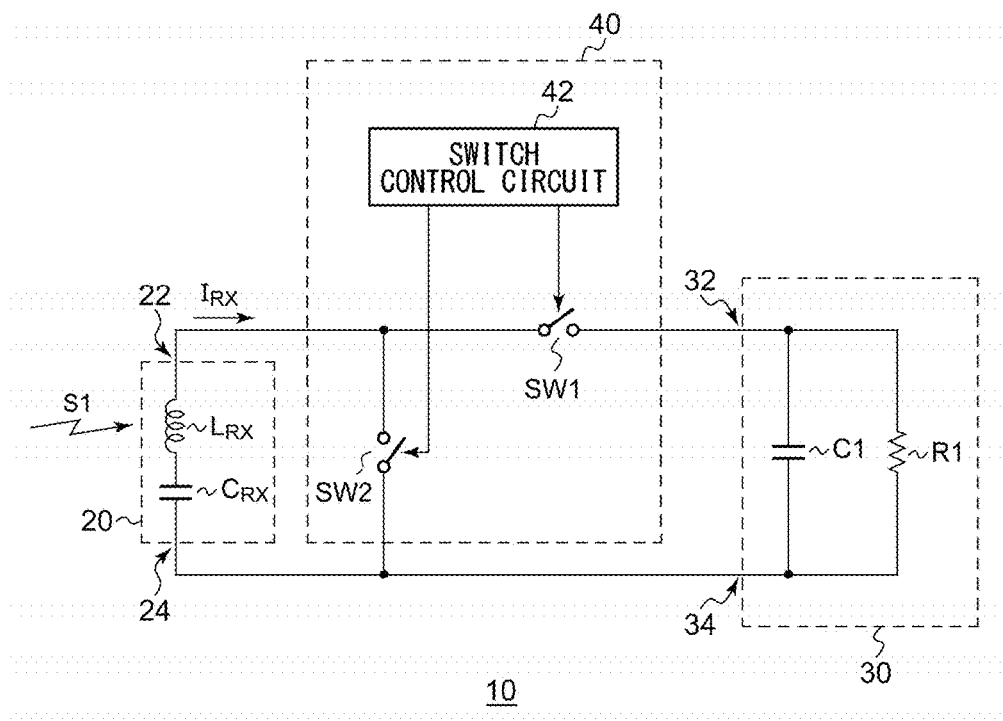
FIG. 2 is a circuit diagram showing a configuration of a wireless power receiving apparatus including an impedance control circuit according to a first embodiment.

FIG. 2 is a circuit diagram showing a configuration of the wireless power receiving apparatus 10 including the impedance control circuit 40 according to the first embodiment.

The impedance control circuit 40 includes a first switch SW1, a second switch SW2, and a switch control circuit 42.

The first switch SW1 is arranged between one terminal 22 of the reception antenna 20 and one terminal 32 of the load 30. The second switch SW2 is arranged between the aforementioned one terminal 22 and the other terminal 24 of the reception antenna 20. The first switch SW1 and the second switch SW2 may each be configured using a MOSFET (Metal Oxide Semiconductor Field Effect Transistor), a bipolar transistor, an IGBT (Insulated Gate Bipolar Transistor), or the like. The first switch SW1 and the second switch SW2 may each be configured as a uni-directional switch or otherwise a bi-directional switch. The switch control circuit 42 controls the switching operations of the first switch SW1 and the second switch SW2.

The switch control circuit 42 is structured to change the ratio d of the on time $T_{ON}$ of the first switch SW1 with respect to the period of the electric power signal S1, i.e., with respect to the period Tp of the coil current $I_{RX}$, which is represented by $d=T_{ON}/Tp$.

In the present embodiment, the flow of the coil current $I_{RX}$ in the direction of the arrow shown in FIG. 2 is defined as the positive direction, and the reverse direction is defined as the negative direction. As described above, the impedance control circuit 40 rectifies the coil current $I_{RX}$, and supplies the coil current $I_{RX}$ thus rectified to the load 30. Description will be made below regarding the impedance control circuit 40. The impedance control circuit is structured to switch its mode between at least two modes, i.e., the first mode and the second mode.

(1) First Mode

In the first mode, the switch control circuit 42 synchronously rectifies the coil current $I_{RX}$. Specifically, the switch control circuit 42 turns on the first switch SW1 and turns off the second switch SW2 for the entire period of the first half cycle ($T_{ON}=Tp/2$) in which the coil current $I_{RX}$ is induced in the reception antenna 20 such that it flows in the first direction (positive direction). On the other hand, the switch control circuit 42 turns off the first switch SW1 and turns on the second switch SW2 for the entire period of the second half cycle (Tp/2) in which the coil current $I_{RX}$ is induced in the reception antenna 20 such that it flows in the second direction (negative direction). In the first mode, the coil current $I_{RX}$ is half-wave rectified, and the load 30 is supplied with the coil current $I_{RX}$ thus half-wave rectified.

The impedance control circuit 40 uses the first mode synchronous rectification operation as the basic control operation. In the second mode and the third mode, the impedance control circuit 40 changes the switching operations of the first switch SW1 and the second switch SW2 in the first half cycle from those in the first mode, so as to change the receiver end impedance Z on the load side as viewed from the reception antenna 20.

(2) Second Mode

Figures 3A, 3B:
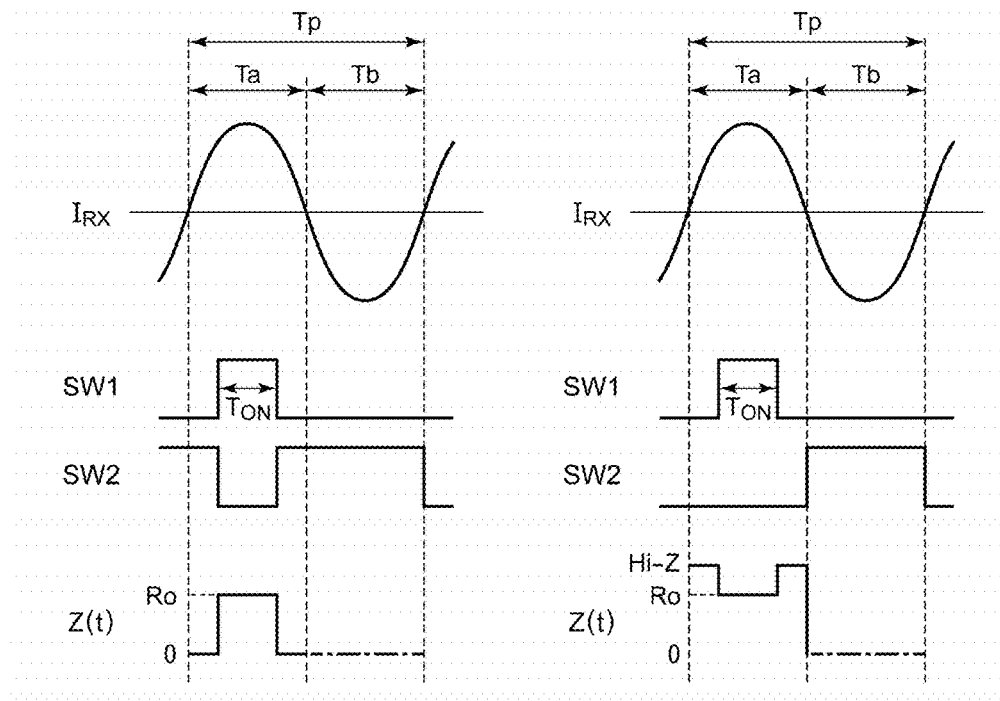
FIGS. 3A and 3B are operation waveform diagrams showing the operations of the impedance control circuit in the second mode and in the third mode, respectively.

FIG. 3A is an operation waveform diagram showing the operation of the impedance control circuit 40 in the second mode. It should be noted that, in many diagrams, the coil current $I_{RX}$ is represented by a sine waveform, which is a virtual waveform that occurs in a case in which an ideal resistance load is connected to the reception antenna 20. That is to say, the coil current $I_{RX}$ has an actual waveform that differs from such a virtual waveform.

In the first half cycle Ta in which the coil current $I_{RX}$ is induced in the reception antenna 20 such that it flows in the positive direction, the switch control circuit 42 turns on the first switch SW1 and turns off the second switch SW2 during a variable on time $T_{ON}$ ($=Tp\times d$). Furthermore, during the remainder of the first half cycle Ta ($=Tp/2-T_{ON}$), the switch control circuit 42 turns off the first switch SW1 and turns on the second switch SW2. As described above, the switch control circuit 42 turns off the first switch SW1 and turns on the second switch SW2 for the second half cycle Tb.

The impedance control circuit 40 may be structured to operate in the third mode, in addition to the first mode and the second mode.

(3) Third Mode

FIG. 3B is an operation waveform diagram showing the operation of the impedance control circuit 40 in the third mode.

In the first half cycle Ta in which the coil current $O_{RX}$ is induced in the reception antenna 20 such that it flows in the positive direction, the switch control circuit 42 turns on the first switch SW1 and turns off the second switch SW2 during a variable on time $T_{ON}$ ($=Tp\times d$). Furthermore, during the remainder of the first half cycle Ta ($=Tp/2-T_{ON}$), the switch control circuit 42 turns off the first switch SW1 and turns off the second switch SW2. In the second half cycle Tb, the switch control circuit 42 turns off the first switch SW1 and turns on the second switch SW2 in the same manner as in the first mode and the second mode.

The above is the configuration and the operation of the wireless power supply apparatus 2. The wireless power supply apparatus 2 provides the following advantages.

Figure 4:
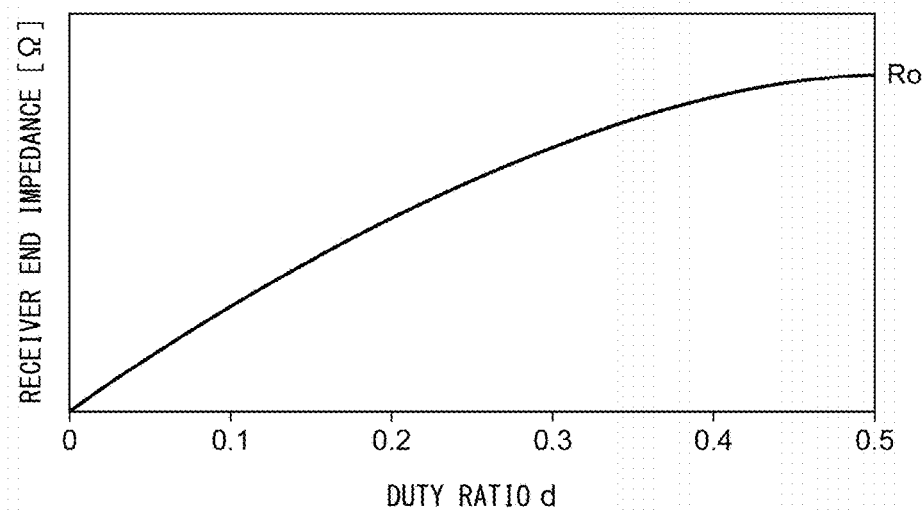
FIG. 4 is a diagram showing the relation between the duty ratio d and the receiver end impedance Z when a switching control operation is performed in the second mode.

FIG. 4 is a diagram showing the relation between the duty ratio d and the receiver end impedance Z when the switching control operation is performed in the second mode. When d=0.5, the switching control operation is equivalent to the control operation in the first mode described in (1), which exhibits the maximum impedance Z.

When the duty ratio d is reduced to a value that is smaller than 0.5, the reception antenna 20 is shorted to the ground by means of the second switch SW2 during the off period of the first switch SW1 in the first half cycle Ta. This reduces the instantaneous value Z(t) of the receiver end impedance. The reduction in the duty ratio d means that there is an increase in the period during which both ends of the reception antenna 20 are shorted to the ground. The receiver end impedance Z is the time average of the instantaneous value Z(t) of the impedance of the load 30 as viewed from the reception antenna 20. Thus, by selecting the second mode, and by reducing the duty ratio d in the second mode thus selected, such an arrangement allows the receiver end impedance Z to be reduced.

Description will be made regarding an arrangement in which the duty ratio d is reduced in the third mode. When the duty ratio d is reduced to a value that is smaller than 0.5 in the third mode, both ends of the reception antenna 20 are set to the open state during a period in which the first switch SW1 is turned off in the first half cycle Ta. This increases the instantaneous value Z(t) of the receiver end impedance. The reduction in the duty ratio d means that there is an increase in the period during which both ends of the reception antenna 20 are set to the open state. The receiver end impedance Z is the time average of the instantaneous value Z(t) of the impedance of the load 30 as viewed from the reception antenna 20. Thus, by selecting the third mode, and by reducing the duty ratio d in the third mode thus selected, such an arrangement allows the receiver end impedance Z to be increased.

With such a wireless power receiving apparatus, the voltage that develops at each node has a very large amplitude. Thus, with conventional high-frequency circuits, in order to perform the impedance control operation, there is a need to use a variable capacitor or the like having a mechanical configuration. This leads to a problem of increased costs. Furthermore, such a mechanical impedance variable element has a problem of poor responsiveness. This leads to a problem in that such a mechanical impedance variable element cannot follow the change in the coupling coefficient k.

In contrast, with the impedance control circuit 40 according to the embodiment, by employing the electric switches SW1 and SW2, such an arrangement has an advantage of reduced costs. Furthermore, such an arrangement provides a high-speed impedance control operation, thereby following a high-speed change in the coupling coefficient k.

Second Embodiment

Figure 5:
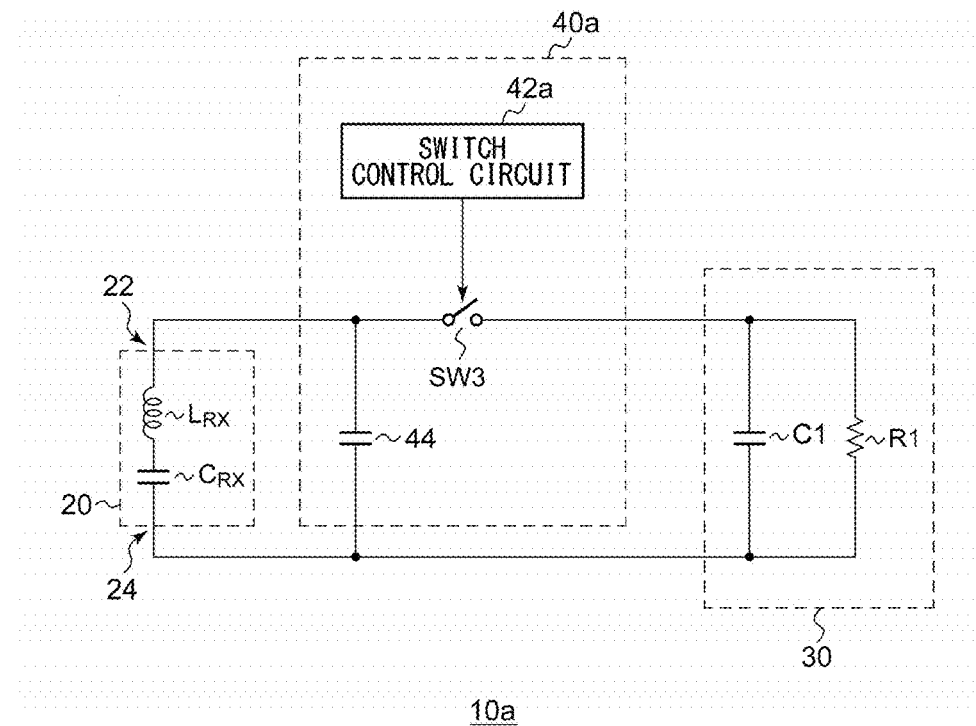
FIG. 5 is a circuit diagram showing a configuration of a wireless power receiving apparatus including an impedance control circuit according to a second embodiment.

FIG. 5 is a circuit diagram showing a configuration of a wireless power receiving apparatus 10a including an impedance control circuit 40a according to a second embodiment.

The impedance control circuit 40a includes a third switch SW3, an impedance element 44, and a switch control circuit 42a.

A third switch SW3 is arranged between one end 22 of the reception antenna 20 and one end 32 of the load 30. The third switch SW3 is configured as a uni-directional switch or otherwise a bi-directional switch. The third switch SW3 is configured using a MOSFET, a bipolar transistor, an IGET, or the like. The impedance element 44 is arranged between one end 22 of the reception antenna 20 and the other end 24.

The switch control circuit 42a controls the switching operation of the third switch SW3. The switch control circuit 42a is structured to change the ratio d of the on time $T_{ON}$ of the third switch SW3 with respect to the period of the electric power signal S1, i.e., the period Tp of the coil current $I_{RX}$.

In the first half cycle Ta in which the coil current $I_{RX}$ is induced in the reception antenna 20 such that it flows in the positive direction, during the variable on time $T_{ON}$ (=Tp×d), the switch control circuit 42a turns on the third switch SW3. During the remainder of the first half cycle Ta, the switch control circuit 42a turns off the third switch SW3. Furthermore, the switch control circuit 42a turns off the third switch SW3 in the second half cycle Tb in which the coil current $I_{RX}$ is induced in the reception antenna 20 such that it flows in the negative direction.

The impedance element 44 is arranged in order to suppress a surge in the impedance between both ends of the reception antenna 20 when the third switch SW3 is turned off in the first half cycle Ta. As shown in FIG. 5, a capacitor may preferably be employed as the impedance element 44. Also, a clamp circuit, a Zener diode, or the like may be employed instead of the capacitor.

Next, description will be made regarding the operation of the impedance control circuit 40a.

Figure 6:
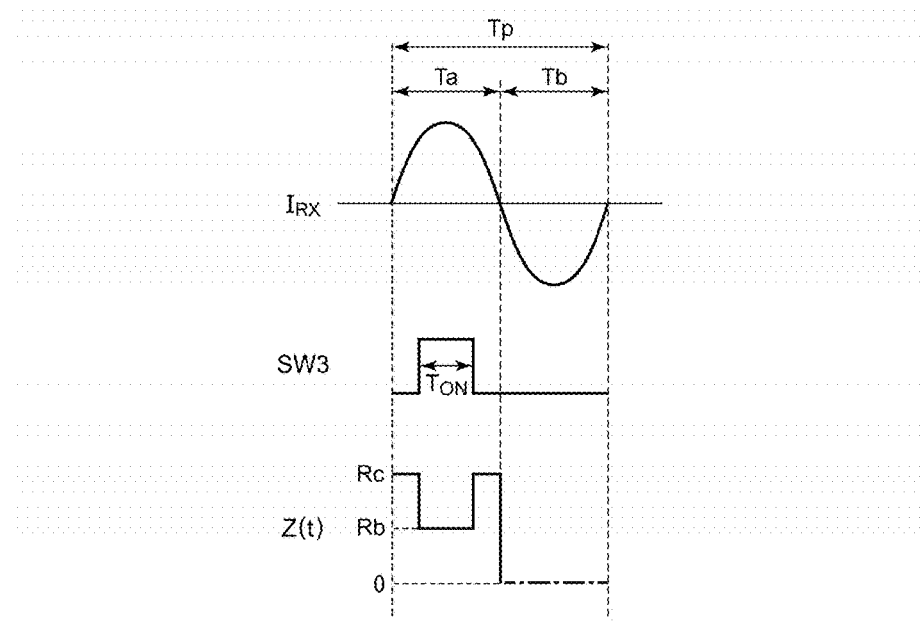
FIG. 6 is an operation waveform diagram showing the operation of the impedance control circuit shown in FIG. 5.

FIG. 6 is an operation waveform diagram showing the operation of the impedance control circuit 40a shown in FIG. 5.

In the first half cycle Ta in which the coil current $I_{RX}$ is induced such that it flows in the positive direction, during the variable on time $T_{ON}$ (=Tp×d), the switch control circuit 42a turns on the third switch SW3. During this period, the instantaneous value Z(t) of the receiver end impedance is equal to the resultant impedance Rb of the load 30 and the impedance element 44.

Furthermore, the switch control circuit 42a turns off the third switch SW3 during the remainder of the first half cycle Ta (Tp/2−$T_{ON}$). In this period, the instantaneous value Z(t) of the receiver end impedance is equal to the impedance Rc of the impedance element 44, which is higher than the impedance of the load 30.

With the impedance control circuit 40a shown in FIG. 5, when d=0.5, this state is equivalent to the first mode described in (1) in the first embodiment. In this state, the receiver end impedance Z exhibits a minimum value Ro.

It can be understood that the impedance control circuit 40a shown in FIG. 5 performs an operation that is equivalent to the operation of the impedance control circuit shown in FIG. 2 in the third mode. Specifically, the first switch SW1 shown in FIG. 2 corresponds to the third switch SW3 shown in FIG. 5. The second switch SW2 shown in FIG. 2 corresponds to the impedance element 44 shown in FIG. 5.

In a case in which the second switch SW2 shown in FIG. 2 is configured as a MOSFET, the second switch SW2 has a body diode that operates as a clamp circuit.

With the impedance control circuit 40a shown in FIG. 5, when the duty ratio d is set to a value that is smaller than 0.5, during the off period of the third switch SW3 in the first half cycle Ta, the reception antenna 20 is substantially set to the open state. In this state, the instantaneous value Z(t) of the receiver end impedance rises. A reduction in the duty ratio d means that there is an increase in the period during which both ends of the reception antenna 20 are set to the open state. The receiver end impedance Z is the time average of the instantaneous value Z(t) of the impedance of the load 30 as viewed from the reception antenna 20. Thus, by selecting the third mode, and by reducing the duty ratio d in the third mode thus selected, such an arrangement is capable of setting the receiver end impedance Z to a value that is greater than the minimum value Ro.

In addition, the impedance control circuit 40a provides the same advantages as those provided by the impedance control circuit 40 shown in FIG. 2.

Third Embodiment

Figure 7:
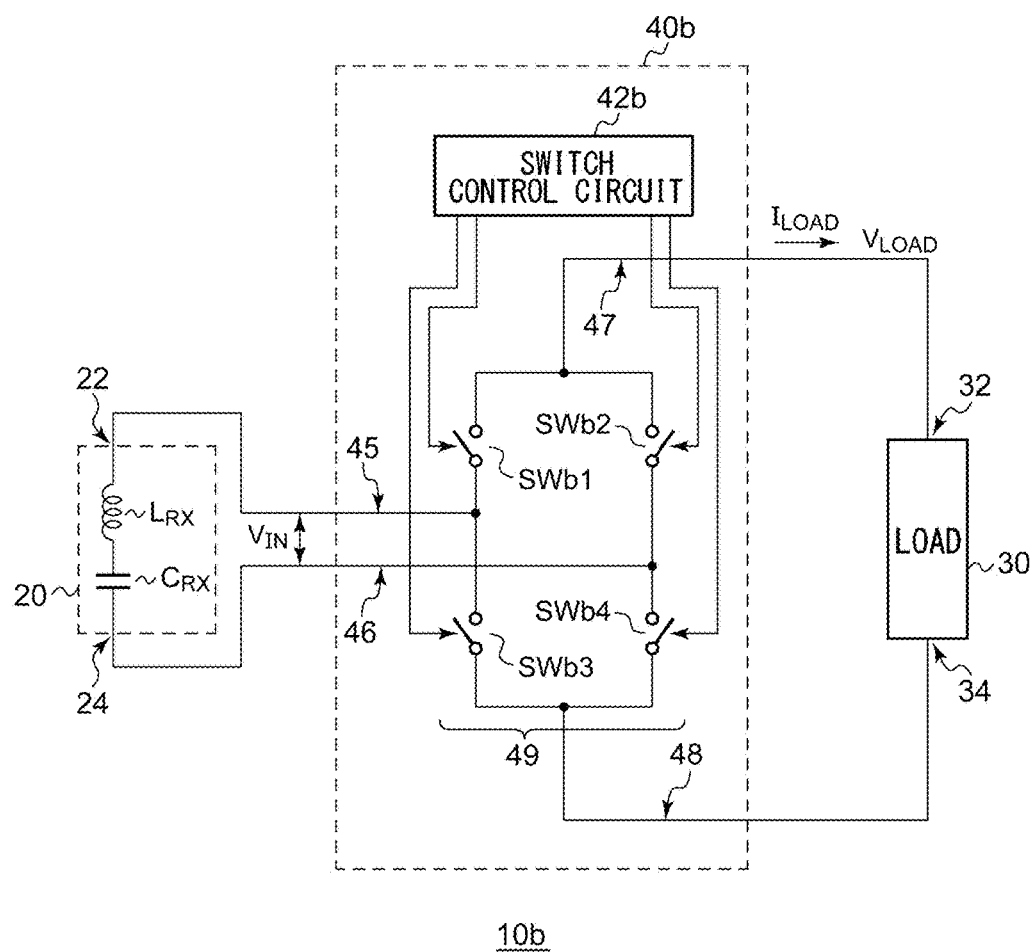
FIG. 7 is a circuit diagram showing a configuration of a wireless power receiving apparatus including an impedance control circuit according to a third embodiment.

FIG. 7 is a circuit diagram showing a configuration of a wireless power receiving apparatus 10b including an impedance control circuit 40b according to a third embodiment.

The wireless power receiving apparatus 10b includes a first input line 45, a second input line 46, a first output line 47, a second output line 48, an H-bridge circuit 49, and a switch control circuit 42b.

The first input line 45 is connected to one end 22 of the reception antenna 20. The second input line 46 is connected to the other end 24 of the reception antenna 20. The first output line 47 is connected to one end 32 of the load 30. The second output line 48 is connected to the other end 34 of the load 30.

The H-bridge circuit 49 is connected to the first input line 45, the second input line 46, the first output line 47, and the second output line 48. The H-bridge circuit 49 rectifies the coil current $I_{RX}$ input to the input lines 45 and 46, and supplies the coil current $I_{RX}$ thus rectified to the load 30 via the output lines 47 and 48. Furthermore, the H-bridge circuit 49 controls the receiver end impedance Z on the load 30 side as viewed from the reception antenna 20.

The H-bridge circuit 49 includes a first switch SWb1, a second switch SWb2, a third switch SWb3, and a fourth switch SWb4. The first switch SWb1 is arranged between the first input line 45 and the first output line 47. The second switch SWb2 is arranged between the second input line 46 and the first output line 47. The third switch SWb3 is arranged between the first input line 45 and the second output line 48. The fourth switch SWb4 is arranged between the second input line 46 and the second output line 48.

The switch control circuit 42b controls the first switch SWb1 through the fourth switch SWb4. More specifically, the switch control circuit 42b is structured to change the phase of the switching operation of each of the first switch SWb1 through the fourth switch SWb4.

Description will be made regarding the control of the switching operation.

Figure 8:
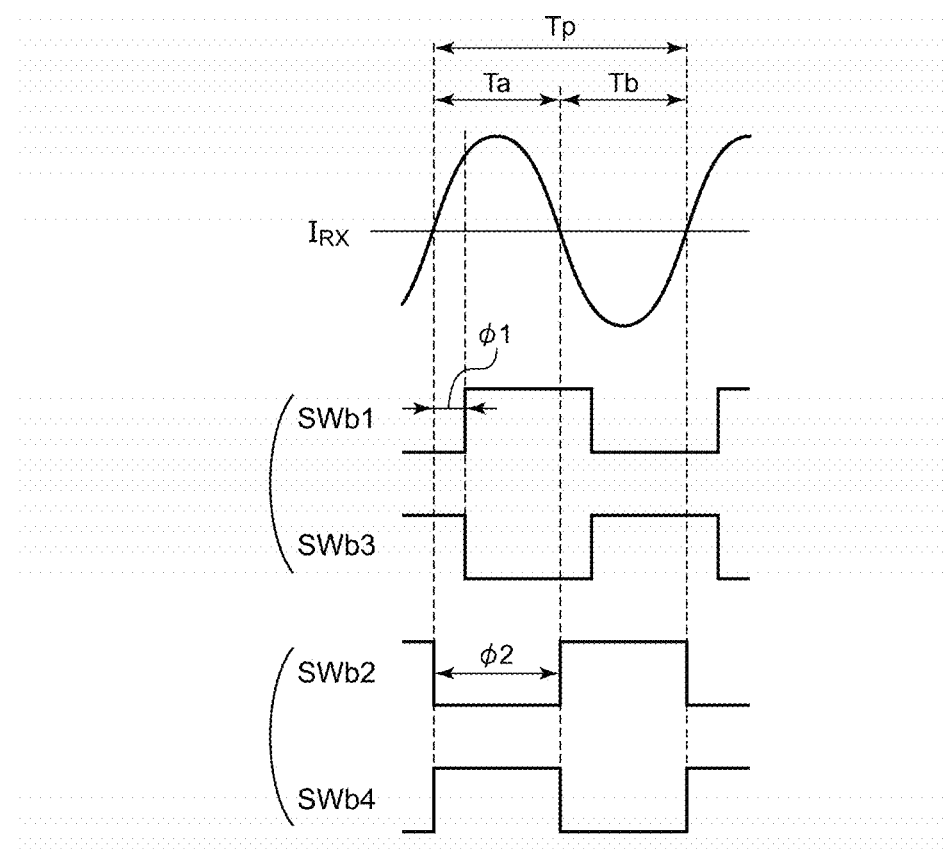
FIG. 8 is a waveform diagram showing a basic operation of the impedance control circuit shown in FIG. 7.

FIG. 8 is a waveform diagram showing the basic operation of the impedance control circuit 40b shown in FIG. 7.

The switch control circuit 42b switches a pair of the first switch SWb1 and the third switch SWb3 in a complementary manner with the same frequency as that of the electric power signal S1, i.e., the same frequency as that of the coil current $I_{RX}$. Similarly, the switch control circuit 42b switches a pair of the second switch SWb2 and the fourth switch SWb4 in a complementary manner with the same frequency as that of the coil current $I_{RX}$. Furthermore, the switch control circuit 42b is structured to independently change the phase φ1 of the switching operation for the pair of the first switch SWb1 and the third switch SWb3 and the phase φ2 of the switching operation for the pair of the second switch SWb2 and the fourth switch SWb4. In the present embodiment, the phases φ1 and φ2 are defined using, as a reference point, the time point at which the direction of the coil current $I_{RX}$ reverses from the second direction (negative direction) to the first direction (positive direction).

The above is the configuration of the impedance control circuit 40b. Next, description will be made regarding the operation of the impedance control circuit 40b.

The impedance control circuit 40b changes the phases φ1 and φ2 so as to change the receiver end impedance Z.

(1) Synchronous Rectification Operation

Figure 10A:
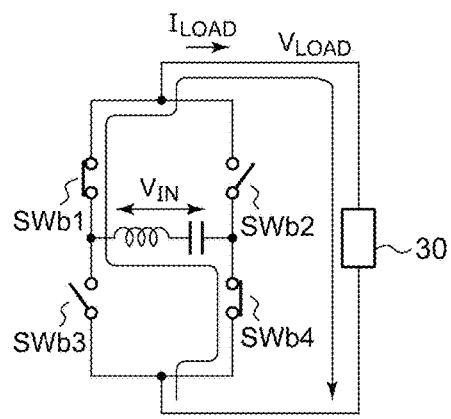
FIGS. 10A and 10B are diagrams each showing a current path of the wireless power receiving apparatus 10*b* when $\varphi 1=0$ degrees and $\varphi 2=180$ degrees.
Figure 10B:
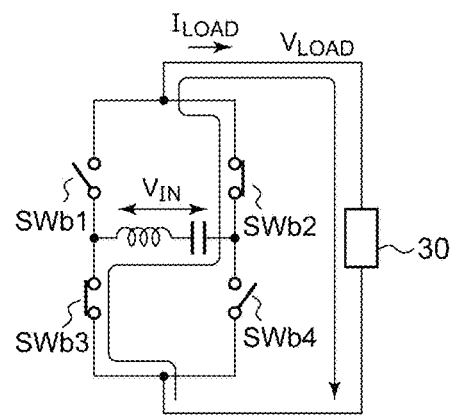

FIG. 9 is an operation waveform diagram showing the operation of the wireless power receiving apparatus 10b when φ1=0 degrees and φ2=180 degrees. FIGS. 10A and 10B are diagrams each showing a current path of the wireless power receiving apparatus 10b when φ1=0 degrees and φ2=180 degrees. In the first half cycle Ta, as shown in FIG. 10A, the first switch SWb1 and the fourth switch SWb4 are turned on (first state ST1). In the second half cycle Tb, as shown in FIG. 10b, the second switch SWb2 and the third switch SWb3 are turned on (third state ST3). The impedance control circuit 40b alternately switches the state between first state ST1 and the third state ST3 in synchronization with the electric power signal S1.

The impedance control circuit 40b changes the phases φ1 and φ2 based on this synchronous rectification operation, so as to change the receiver end impedance Z on the load 30 side as viewed from the reception antenna 20.

(2) Operation for Reducing the Receiver end Impedance

Figure 11:
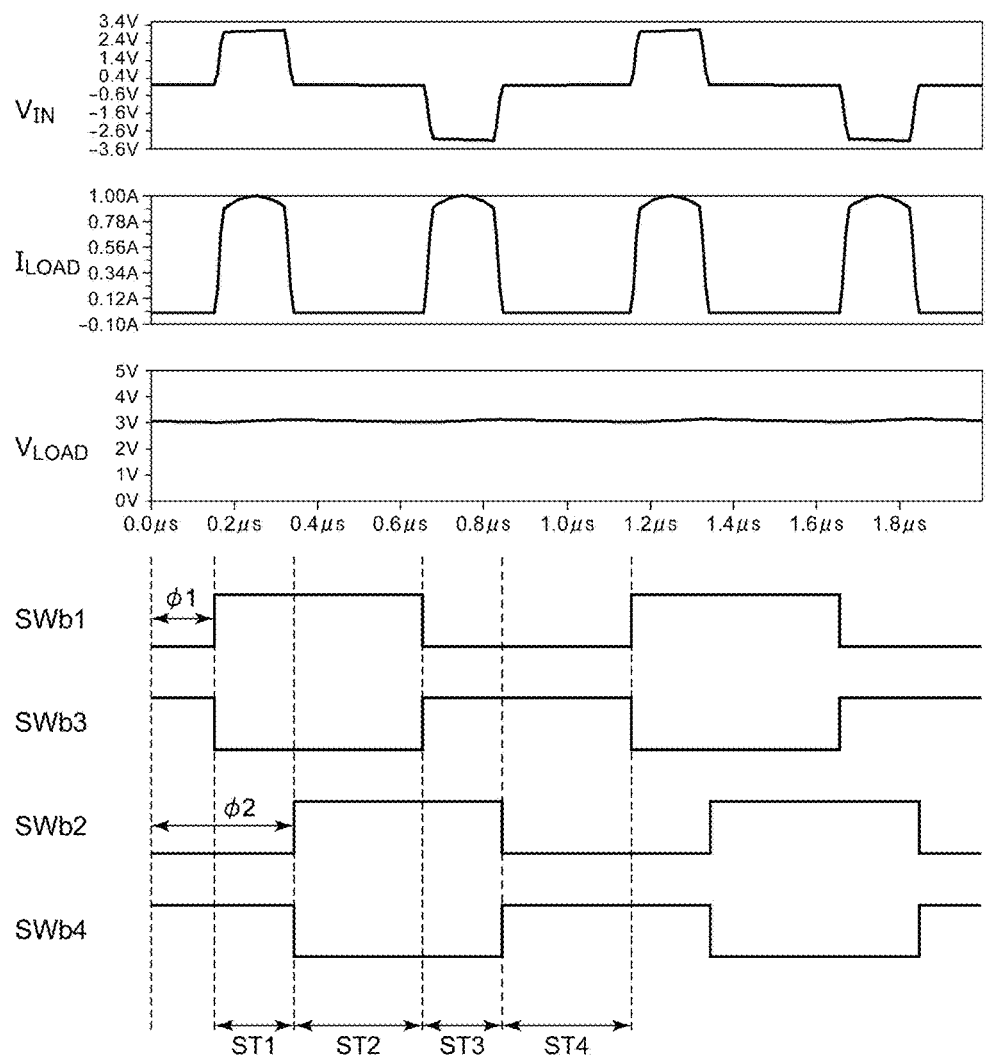
FIG. 11 is an operation waveform diagram showing the operation of the wireless power receiving apparatus when $\varphi 1=60$ degrees and $\varphi 2=120$ degrees.

FIG. 11 is an operation waveform diagram showing the operation of the wireless power receiving apparatus 10b when φ1=60 degrees and φ2=120 degrees. FIGS. 12A through 12D are diagrams each showing a current path of the wireless power receiving apparatus 10b when φ1=60 degrees and φ2=120 degrees.

Figure 12:
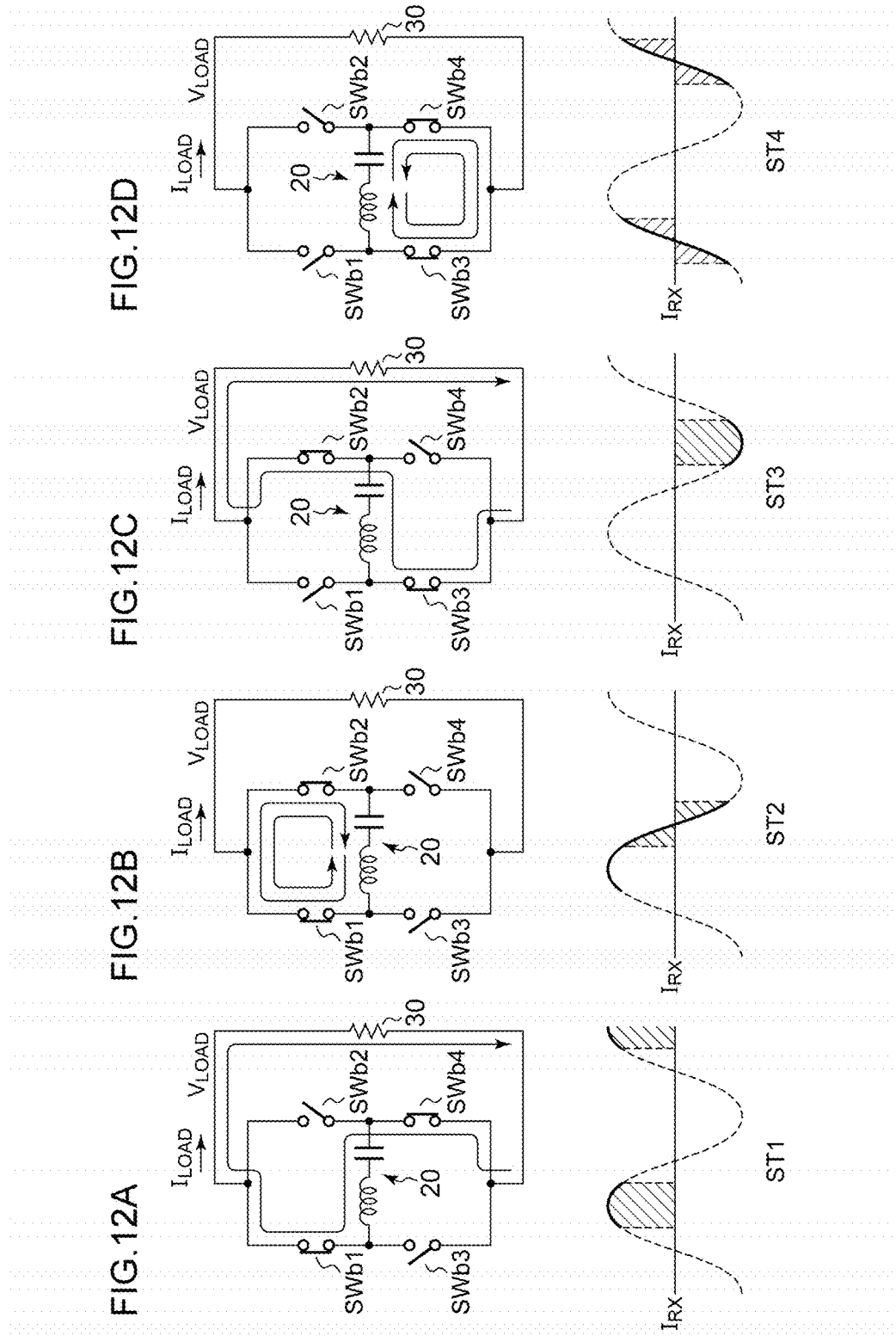
FIGS. 12A through 12D are diagrams each showing a current path of the wireless power receiving apparatus when $\varphi 1=60$ degrees and $\varphi 2=120$ degrees.

As shown in FIG. 11, the wireless power receiving apparatus 10b sequentially repeats the cycle of the first state ST1 through the fourth state ST4. In the first state ST1, as shown in FIG. 12A, the first switch SWb1 and the fourth switch SWb4 are turned on. In this state, the coil current $I_{RX}$ is supplied to the load 30.

In the subsequent second state ST2, as shown in FIG. 12B, the first switch SWb1 and the second switch SWb2 are turned on. In this state, the coil current $I_{RX}$ flows through a loop path.

In the third state ST3, as shown in FIG. 12C, the second switch SWb2 and the third switch SWb3 are turned on. In this state, the coil current $I_{RX}$ is supplied to the load 30.

In the subsequent fourth state ST4, as shown in FIG. 12D, the third switch SWb3 and the fourth switch SWb4 are turned on. In this state, the coil current $I_{RX}$ flows through another loop path.

In the second state ST2 and in the fourth state ST4, the reception antenna 20 is shorted to the ground. This leads to a reduction in the instantaneous value Z(t) of the receiver end impedance. As a result, by repeating the cycle of the first state ST1 through the fourth state ST4, such an arrangement is capable of reducing the receiver end impedance Z, as compared with the synchronous rectification operation. With such an arrangement, the receiver end impedance Z can be reduced according to an increase in the second state ST2 and an increase in the fourth state ST4.

(3) Operation for Increasing the Receiver end Impedance

Figure 13:
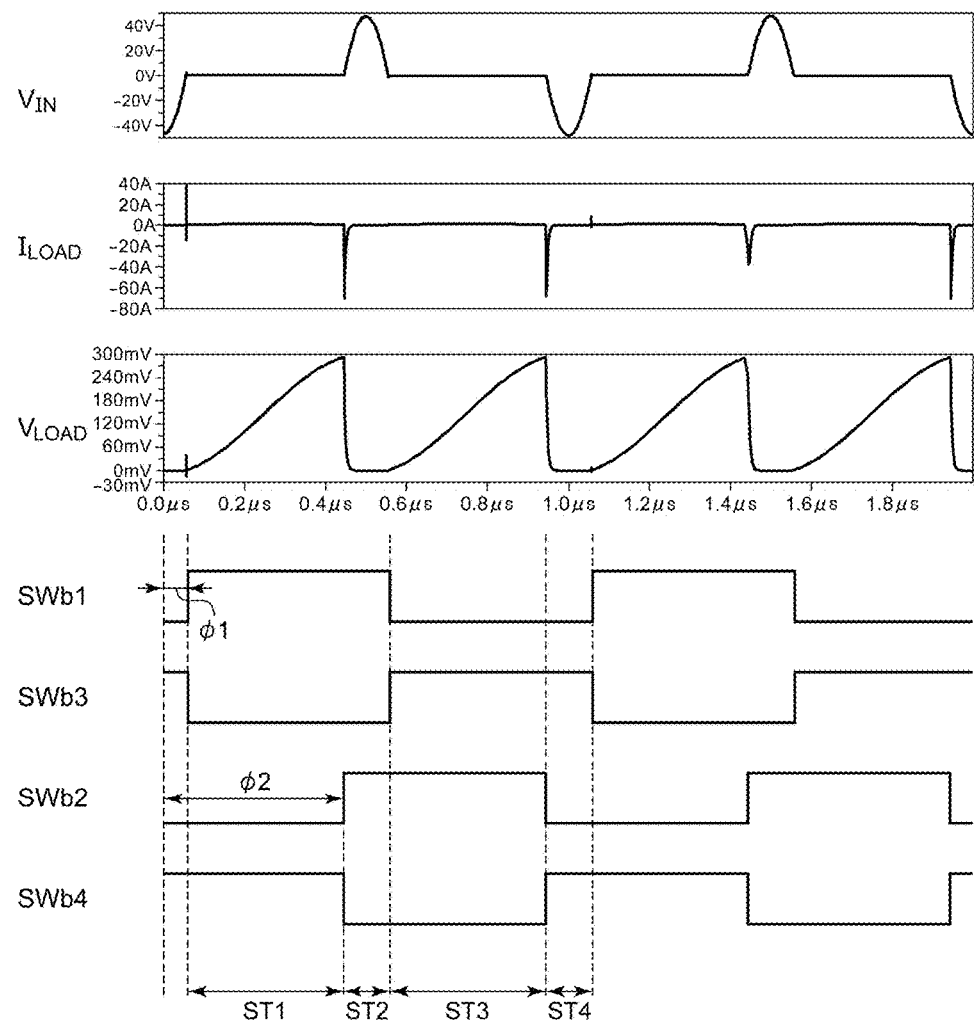
FIG. 13 is an operation waveform diagram showing the operation of the wireless power receiving apparatus when $\varphi 1=30$ degrees and $\varphi 2=150$ degrees.

FIG. 13 is an operation waveform diagram showing the operation of the wireless power receiving apparatus 10b when φ1=30 degrees and φ2=150 degrees. With such an arrangement, the impedance control circuit 40b sequentially repeats the cycle of the first state ST1 through the fourth state ST4. The point of difference between this operation and the operation described above in (2) is the length of each period and a transition timing.

When the control operation is performed with the phase shown in FIG. 13, the current $I_{LOAD}$ that flows to the load 30 becomes very small. This increases the receiver end impedance Z, which is represented by $Z=V_{IN}/I_{LOAD}$.

As described above, with the impedance control circuit 40b according to the third embodiment, by changing the phases of the switching operations of the four switches that form the H-bridge circuit, such an arrangement is capable of increasing and reducing the receiver end impedance Z as compared with that provided by the synchronous rectification operation.

As described in the first through third embodiments, by providing the impedance control circuit 40, such an arrangement is capable of changing the receiver end impedance Z. Next, description will be made regarding an example of the control of the receiver end impedance Z.

Figure 14:
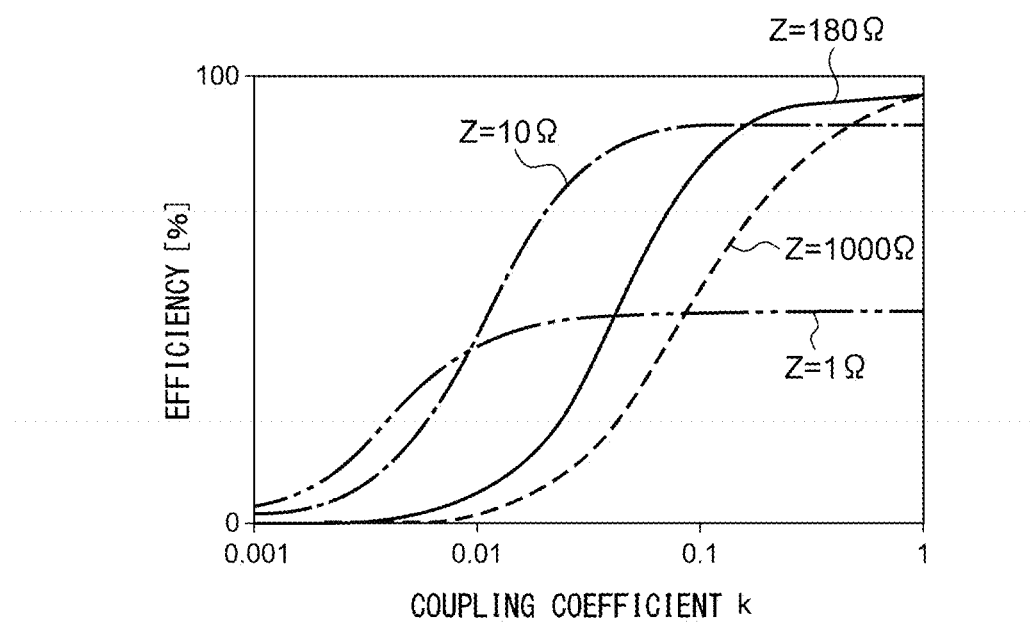
FIG. 14 is a diagram showing the relation between the power supply efficiency and the coupling coefficient k between the transmission coil and the reception coil.

FIG. 14 is a diagram showing the relation between the power supply efficiency and the coupling coefficient k between the transmission coil and the reception coil with the receiver end impedance Z as a parameter. In a case in which the receiver end impedance Z is set to 1Ω, such an arrangement provides relatively high efficiency in a range in which the coupling coefficient k is small. However, such an arrangement provides relatively low efficiency in a range in which the coupling coefficient k is large. Conversely, in a case in which the receiver end impedance Z is set to 1000Ω, such an arrangement provides relatively high efficiency in a range in which the coupling coefficient k is large. However, such an arrangement provides relatively low efficiency in a range in which the coupling coefficient k is small.

With the impedance control circuit according to any one of the first embodiment through the third embodiment, such an arrangement provides a receiver end impedance Z that allows the power supply efficiency to exhibit the largest value for the present coupling coefficient k at any time point.

Also, with the impedance control circuit according to any one of the first embodiment through the third embodiment, such an arrangement provides a receiver end impedance Z that allows the amount of supplied electric power to exhibit the largest value for the present coupling coefficient k at any time point.

It should be noted that, with actual wireless power supply systems, it is difficult to directly monitor the present coefficient k. In order to solve such a problem, the impedance control circuit 40 may monitor information having a correlation with the coupling coefficient k, e.g., the coil current, the voltage supplied to the load, or the like, and may control the switching operation for each switch according the detection value.

Description has been made regarding the present invention with reference to the embodiments. The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Description has been made in the third embodiment regarding an arrangement in which, in the second state ST2, a loop is formed by means of the first switch SWb1 and the second switch SWb2. Also, such a loop may be formed by means of the third switch SWb3 and the fourth switch SWb4 instead of the first switch SWb1 and the second switch SWb2. Similarly, description has been made in the third embodiment regarding an arrangement in which, in the fourth state ST4, a loop is formed by means of the third switch SWb3 and the fourth switch SWb4. Also, such a loop may be formed by means of the first switch SWb1 and the second switch SWb2 instead of the third switch SWb3 and the fourth switch SWb4.

Description has been made in the third embodiment regarding an arrangement in which the first switch SWb1 and the third switch SWb3 are arranged as a pair, the second switch SWb2 and the fourth switch SWb4 are arranged as a pair, and the phases φ1 and φ2 are changed so as to provide the first state ST1 through the fourth state ST4. However, the present invention is not restricted to such an arrangement. Also, the first switch SWb1 through the fourth switch SWb4 may be independently controlled so as to provide the first state ST1 through the fourth state ST4.

While the preferred embodiments of the present invention have been described using specific terms, such description is for illustrative purposes only, and it is to be understood that changes and variations may be made without departing from the spirit or scope of the appended claims.

What is claimed is:

1. An impedance control circuit employed in a wireless power receiving apparatus that receives an electric power signal including any one from among an electric field component, a magnetic field component, and an electromagnetic field component transmitted from a wireless power supply apparatus, and arranged between a reception antenna arranged to receive the electric power signal and a load, the impedance control circuit comprising:
 a first switch arranged between one end of the reception antenna and one end of the load;
 a second switch arranged between said one end of the reception antenna and an other end of the reception antenna; and
 a switch control circuit that switches on and off the first switch and the second switch at a frequency of the electric power signal,
 wherein the switch control circuit is structured to change a ratio of an on time of the first switch with respect to a period of the electric power signal.

2. The impedance control circuit according to claim 1, wherein the switch control circuit turns on the first switch and turns off the second switch during a variable on time in a first half cycle in which a current is induced in the reception antenna such that it flows in a first direction, and turns off the first switch and turns on the second switch during a remainder of the first half cycle.

3. The impedance control circuit according to claim 1, wherein the switch control circuit turns on the first switch and turns off the second switch during a variable on time in a first half cycle in which a current is induced in the reception antenna such that it flows in a first direction, and turns off the first switch and the second switch during a remainder of the first half cycle.

4. The impedance control circuit according to claim 2, wherein the switch control circuit turns off the first switch and turns on the second switch during a period of a second half cycle in which a current is induced in the reception antenna such that it flows in a second direction.

5. A wireless power receiving apparatus comprising:
 a reception antenna that receives an electric power signal including any one from among an electric field component, a magnetic field component, and an electromagnetic field component transmitted from a wireless power supply apparatus; and
 the impedance control circuit according to claim 1, connected to the reception antenna.

6. An impedance control circuit employed in a wireless power receiving apparatus that receives an electric power signal including any one from among an electric field component, a magnetic field component, and an electromagnetic field component transmitted from a wireless power supply apparatus, and arranged between a reception antenna arranged to receive the electric power signal and a load, the impedance control circuit comprising:
 a third switch arranged between one end of the reception antenna and one end of the load;
 an impedance element arranged between said one end of the reception antenna and an other end of the reception antenna; and
 a switch control circuit that switches on and off the third switch at a frequency of the electric power signal,
 wherein the switch control circuit is structured to change a ratio of an on time of the third switch with respect to a period of the electric power signal.

7. The impedance control circuit according to claim 6, wherein the switch control circuit turns on the third switch during a variable on time in a first half cycle in which a current is induced in the reception antenna such that it flows in a first direction, and turns off the third switch during a remainder of the first half cycle.

8. The impedance control circuit according to claim 7, wherein the switch control circuit turns off the third switch during a period of a second half cycle in which a current is induced in the reception antenna such that it flows in a second direction.

9. The impedance control circuit according to claim 6, wherein the impedance element comprises a capacitor.

10. The impedance control circuit according to claim 6, wherein the impedance element comprises a clamp circuit.

11. The impedance control circuit according to claim 6, wherein the impedance element comprises a diode.

12. An impedance control circuit employed in a wireless power receiving apparatus that receives an electric power signal including any one from among an electric field component, a magnetic field component, and an electromagnetic field component transmitted from a wireless power supply apparatus, and arranged between a reception antenna arranged to receive the electric power signal and a load, the impedance control circuit comprising:
 a first input line connected to one end of the reception antenna;
 a second input line connected to an other end of the reception antenna;
 a first output line connected to one end of the load;
 a second output line connected to an other end of the load;
 an H-bridge circuit comprising a first switch arranged between the first input line and the first output line, a second switch arranged between the second input line and the first output line, a third switch arranged between the first input line and the second output line, and a fourth switch arranged between the second input line and the second output line; and a switch control circuit that switches on and off the first switch through the fourth switch of the H-bridge circuit, wherein the switch control circuit is structured to change a phase of a switching operation for each of the first switch through the fourth switch, wherein the switch control circuit is structured to sequentially switch its state in synchronization with the electric power signal between:

a first state in which the first switch and the fourth switch are turned on and the second switch and the third switch are turned off;

a second state in which (i) the first switch and the second switch are turned on and the third switch and the fourth switch are turned off, or otherwise (ii) the first switch and the second switch are turned off and the third switch and the fourth switch are turned on;

a third state in which the second switch and the third switch are turned on and the first switch and the fourth switch are turned off; and a fourth state in which (i) the first switch and the second switch are turned on and the third switch and the fourth switch are turned off, or otherwise (ii) the first switch and the second switch are turned off and the third switch and the fourth switch are turned on;

and wherein the switch control circuit is further structured to change a length of each of the first state through the fourth state, and wherein the switch control circuit is further structured to change a transition phase of a cycle of the first state through the fourth state.

13. A wireless power receiving apparatus comprising:

a reception antenna that receives an electric power signal including any one from among an electric field component, a magnetic field component, and an electromagnetic field component transmitted from a wireless power supply apparatus; and the impedance control circuit according to claim 12, connected to the reception antenna.

* * * * *